US011035971B2

(12) United States Patent
Vinay et al.

(10) Patent No.: US 11,035,971 B2
(45) Date of Patent: Jun. 15, 2021

(54) DATA QUALITY MONITORING AND CONTROL SYSTEMS AND METHODS

(71) Applicant: NABORS DRILLING TECHNOLOGIES USA, INC., Houston, TX (US)

(72) Inventors: Namitha Vinay, Cypress, TX (US); Srikanth Valleru, Spring, TX (US); Jayaprasad Jayabal, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 365 days.

(21) Appl. No.: 16/161,937

(22) Filed: Oct. 16, 2018

(65) Prior Publication Data

US 2020/0116887 A1   Apr. 16, 2020

(51) Int. Cl.
| | |
|---|---|
| *G01V 1/50* | (2006.01) |
| *G01V 3/38* | (2006.01) |
| *G01V 3/30* | (2006.01) |
| *E21B 47/14* | (2006.01) |
| *G06N 20/00* | (2019.01) |
| *E21B 47/13* | (2012.01) |

(52) U.S. Cl.
CPC ............... *G01V 1/50* (2013.01); *E21B 47/13* (2020.05); *E21B 47/14* (2013.01); *G01V 3/30* (2013.01); *G01V 3/38* (2013.01); *G06N 20/00* (2019.01); *G01V 2200/14* (2013.01); *G01V 2210/60* (2013.01); *G01V 2210/72* (2013.01)

(58) Field of Classification Search
CPC ... G01V 1/50; G01V 3/38; G01V 3/30; G01V 2210/72; G01V 2200/14; G01V 2210/60; G01V 1/44; G01V 2200/16; E21B 47/13; E21B 47/14; E21B 1/00; G06N 20/00; G06N 5/02

See application file for complete search history.

(56) References Cited

U.S. PATENT DOCUMENTS 10,851,645 B2 * 12/2020 Mandava ................ E21B 47/10
2017/0122092 A1 * 5/2017 Harmer ................... E21B 44/00

* cited by examiner

*Primary Examiner* — Natalie Huls
*Assistant Examiner* — Michael J Singletary
(74) *Attorney, Agent, or Firm* — Haynes and Boone, LLP

(57) ABSTRACT

A system for monitoring data quality in a drilling operation includes a controller and a plurality of data sources configured to provide data to the controller. The controller is configured to receive data from a plurality of data sources during a drilling operation; apply data quality rules to the received data; calculate a score for each data source of the plurality of data sources based on adherence of the received data for that data source to the data quality rules; compare the calculated scores for the plurality of data sources to determine which calculated scores meet or exceed a threshold score; receive a selection of one of the plurality of data sources having a calculated score that meets or exceeds the threshold score; and use the data from the selected data source. Methods and non-transitory machine-readable media for monitoring data quality are also provided.

20 Claims, 4 Drawing Sheets

DATA QUALITY MONITORING AND CONTROL SYSTEMS AND METHODS

BACKGROUND OF THE DISCLOSURE

During oil drilling and production operations, data is typically collected for analysis and/or monitoring of the operations using a variety of sources. Such data may include, for instance, information regarding subterranean formations, equipment, and historical and/or other data.

With the availability of modern data acquisition systems, current drilling operations generate an enormous quantity of data over a time span from weeks to months. Thus, the need to assure data quality in drilling is constantly increasing. Whereas in the past, predominantly human inspection of measurement data was used, today automated analysis and interpretation is available. Good quality data is of extreme importance. Bad data quality can lead to an incorrect analysis and dangerous consequences.

Currently, users set up interfaces to receive data from multiple systems, and end up consuming the data they think is accurate. For example, users can set up an interface to receive a measurement of a downhole parameter from multiple sources and use a value of the downhole parameter from a source based on their perception that the value is accurate.

What is needed is a system and method that can evaluate the quality of data from different data sources and present the user with quality metrics of the data so that the user can make an informed decision on which data source to use. The present disclosure addresses one or more of the problems of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
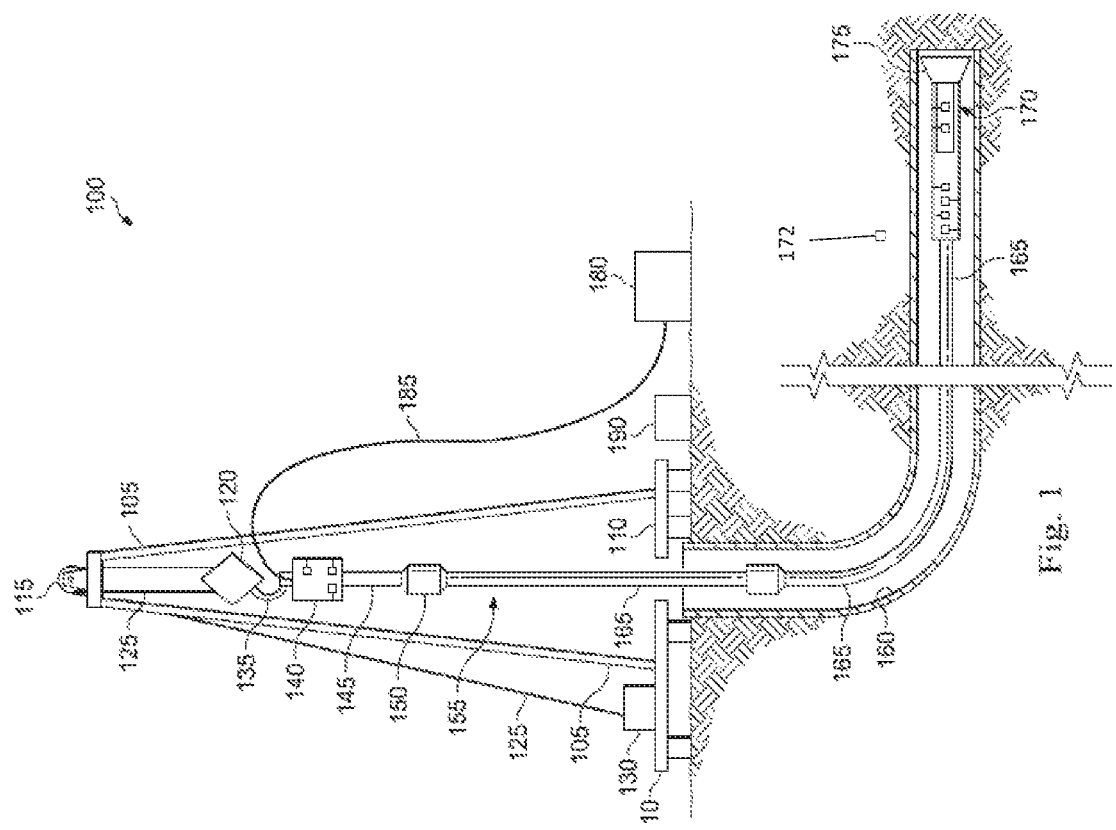
FIG. 1 is a schematic of an apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

This disclosure provides apparatuses, systems, and methods for improved monitoring and managing of data stream quality in well drilling and production operations. The apparatuses, systems, and methods allow a user (alternatively referred to herein as an "operator") or a control system to determine the quality of the data from a single data source or from multiple data sources. In some embodiments, the apparatuses, systems, and methods allow an operator to determine which source of data presents better data quality, and to use that source for data needed in downstream applications. The user is able to configure and map the channels coming in from the different sources, as well as configure the data quality rules that the system needs to evaluate the data. The quality of the data can then be scored, and the results visually presented to the user.

The system is in communication with and receives input from various on-site sensors, as well as remote third-party systems that receive data and perform calculations to provide data. The rate and quality of these measurements can differ depending on the type of sensor and the mode of transmission of the measurements. Advantageously, the data quality of the measurements is first evaluated before making further use of the measurements.

In one embodiment, the received input or data from the various sources relate to the same parameter, event, or operation. For example, the received input or data include rate of penetration (ROP) data from two data sources (e.g., an instrumentation system and from a third party calculation system). The ROP data from the two data sources are analyzed to determine data quality of the two data sources, and the data source with the higher quality ROP data can be selected.

In another embodiment, the received input or data is from a single data source. For example, the quality of the data source can be monitored continuously to determine if there are gaps in the data or if data is outside any technical and/or operational thresholds.

In several embodiments, data quality rules are applied to the data to determine data quality. The data quality rules may be based, for example, on the following characteristics: (1) accuracy, (2) completeness, (3) consistency, and (4) timeliness. These characteristics may be tied to technical thresholds and/or operational thresholds.

In general, the system collects real-time sensor data sampled during operations at the well site, which may include drilling operations, running casing or tubular goods, completion operations, or the like. The system processes the data, determines its quality, and provides nearly instantaneous numerical and visual feedback through a variety of graphical user interfaces ("GUIs").

The GUIs are populated with dynamically updated information, static information, and/or quality metrics, although they may also be populated with other types of information. The users of the system are thus able to view and understand a substantial amount of information about the status of the particular well site operation in a single view and the quality of the data received from different sources for the well site operation.

Referring to FIG. 1, illustrated is a schematic view of an apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

The apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel out and reel in the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly. It should be understood that other conventional techniques for arranging a rig do not require a drilling line, and these are included in the scope of this disclosure. In another aspect (not shown), no quill is present.

The drill string 155 includes interconnected sections of drill pipe 165, a BHA 170, and a drill bit 175. The BHA 170 may include stabilizers, drill collars, and/or measurement-while-drilling (MWD) or wireline conveyed instruments, among other components. The drill bit 175, which may also be referred to herein as a tool, is connected to the bottom of the BHA 170 or is otherwise attached to the drill string 155. One or more pumps 180 may deliver drilling fluid to the drill string 155 through a hose or other conduit 185, which may be fluidically and/or actually connected to the top drive 140.

As shown, the BHA 170 includes a communication subassembly 172 that communicates with the control system 190. The communication subassembly is adapted to send signals to and receive signals from the surface using a communications channel such as mud pulse telemetry, electromagnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

In the exemplary embodiment depicted in FIG. 1, the top drive 140 is used to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a control system 190 configured to control or assist in the control of one or more components of the apparatus 100. For example, the control system 190 may be configured to transmit operational control signals to the drawworks 130, the top drive 140, the BHA 170 and/or the pump 180. The control system 190 may be a stand-alone component installed near the mast 105 and/or other components of the apparatus 100. In some embodiments, the control system 190 is physically displaced at a location separate and apart from the drilling rig.

Figure 2:
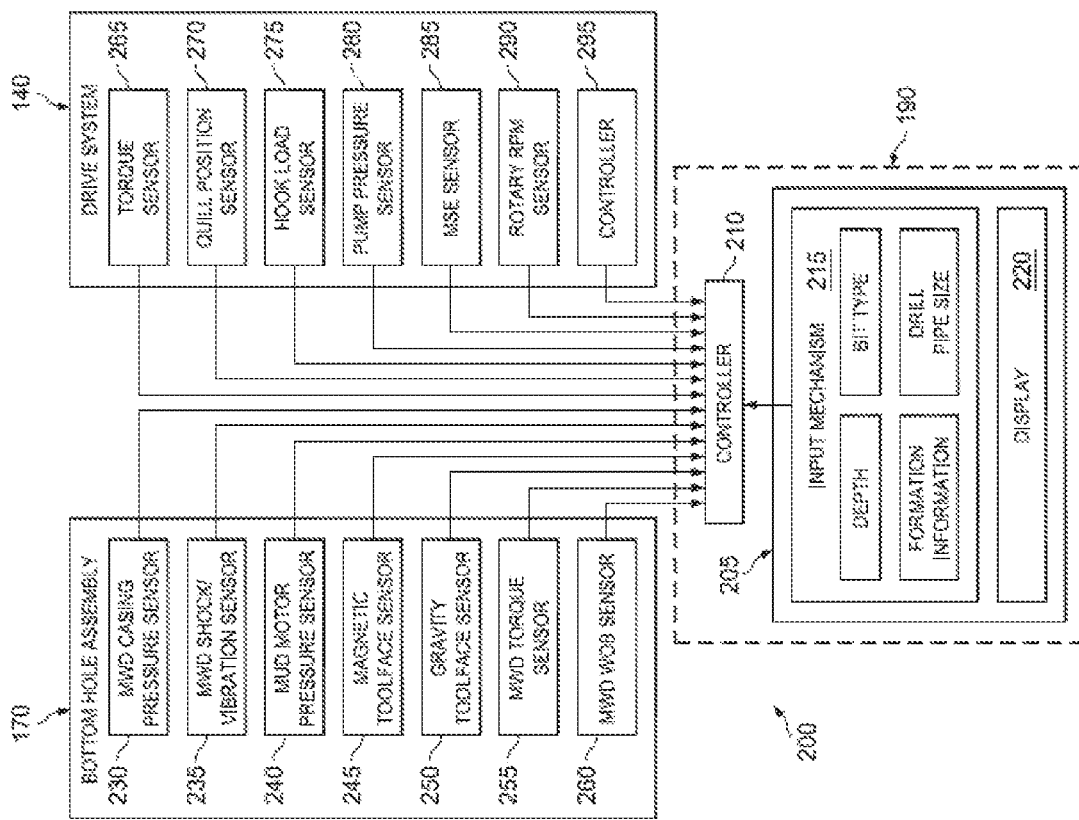
FIG. 2 is a block diagram schematic of an apparatus according to one or more aspects of the present disclosure.

FIG. 2 illustrates a block diagram of a portion of an apparatus 200 according to one or more aspects of the present disclosure. FIG. 2 shows the control system 190, the BHA 170, and the top drive 140, identified as a drive system. The apparatus 200 may be implemented within the environment and/or the apparatus shown in FIG. 1.

The control system 190 includes a user-interface 205 and a controller 210. Depending on the embodiment, these may be discrete components that are interconnected via wired or wireless means. Alternatively, the user-interface 205 and the controller 210 may be integral components of a single system.

During drilling operations, the controller 210 receives data from the sensors or any other device, processes such data to determine its quality, transmits some of the data in real-time, and stores other data in a storage device. In some embodiments, the controller 210 determines a quality level of the real-time data and provides this information to a user. The data gathered by the sensors may be collected by the controller 210 and/or other data collection sources for analysis or other processing. The data collected by the sensors may be used alone or in combination with other data. The data may be collected in one or more databases and/or transmitted on or offsite. The data may be historical data, real time data, or combinations thereof. The data may be used in real time, or stored for later use. As used herein, the term "real time" encompasses a time within 5 minutes of measuring or receiving the data, for example within 1 minute or 30 seconds or less. In some embodiments, real-time data is used and then stored for later use (e.g., quality comparison or analysis). In other embodiments, real-time data is not immediately used, but is stored for later use. The data may also be combined with historical data or other inputs for further analysis. The data may be stored in separate databases, or combined into a single database.

The user-interface 205 may include an input mechanism 215 permitting a user to input technical thresholds, operational thresholds, data quality rules, and any other information. In some embodiments, the input mechanism 215 may be used to input additional drilling settings or parameters, such as acceleration, toolface set points, rotation settings, and other set points or input data. A user may input information relating to the drilling parameters of the drill string, such as BHA information or arrangement, drill pipe size, bit type, depth, formation information, among other things. The input mechanism 215 may include a keypad, voice-recognition apparatus, dial, button, switch, slide selector, toggle, joystick, mouse, data base and/or other conventional or future-developed data input device. Such an input mechanism 215 may support data input from local and/or remote locations. Alternatively, or additionally, the input mechanism 215, when included, may permit user-selection of predetermined profiles, algorithms (e.g., machine-learning algorithms), set point values or ranges, such as via one or more drop-down menus. The data may also or alternatively be selected by the controller 210 via the execution of one or more database look-up procedures. In general, the input mechanism 215 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other means.

The user-interface 205 may also include a display 220 for visually presenting information to the user in textual, graphic, or video form. The display 220 may also be utilized by the user to input drilling parameters, limits, or set point data in conjunction with the input mechanism 215. For example, the input mechanism 215 may be integral to or otherwise communicably coupled with the display 220.

In various embodiments, the display 220 presents the results of a data quality evaluation in graphic form. For example, data from at least two data sources may be presented as two line graphs that are trended over the time that the data was received. The two curves can be lined up against or superimposed over each other so that the user can clearly see the difference in values of the data. In some embodiments, a summary of the data quality for each data source is color-coded so that the user can quickly identify the data source presenting a lower quality (or a higher quality). The user can then use this information to quickly select the data source that provides the better data quality, and use that data source for the data needed for downstream applications.

The BHA 170 may include one or more sensors, typically a plurality of sensors, located and configured about the BHA to detect parameters relating to the drilling environment, the BHA condition and orientation, and other information. In the embodiment shown in FIG. 2, the BHA 170 includes an MWD casing pressure sensor 230 that is configured to detect an annular pressure value or range at or near the MWD portion of the BHA 170. The casing pressure data detected via the MWD casing pressure sensor 230 may be sent via electronic signal to the controller 210 via wired or wireless transmission.

The BHA 170 may also include an MWD shock/vibration sensor 235 that is configured to detect shock and/or vibration in the MWD portion of the BHA 170. The shock/vibration data detected via the MWD shock/vibration sensor 235 may be sent via electronic signal to the controller 210 via wired or wireless transmission.

The BHA 170 may also include a mud motor ΔP sensor 240 that is configured to detect a pressure differential value or range across the mud motor of the BHA 170. The pressure differential data detected via the mud motor ΔP sensor 240 may be sent via electronic signal to the controller 210 via wired or wireless transmission. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque.

The BHA 170 may also include a magnetic toolface sensor 245 and a gravity toolface sensor 250 that are cooperatively configured to detect the current toolface. The magnetic toolface sensor 245 may be or include a conventional or future-developed magnetic toolface sensor which detects toolface orientation relative to magnetic north or true north. The gravity toolface sensor 250 may be or include a conventional or future-developed gravity toolface sensor which detects toolface orientation relative to the Earth's gravitational field. In an exemplary embodiment, the magnetic toolface sensor 245 may detect the current toolface when the end of the wellbore is less than about 7° from vertical, and the gravity toolface sensor 250 may detect the current toolface when the end of the wellbore is greater than about 7° from vertical. However, other toolface sensors may also be utilized within the scope of the present disclosure that may be more or less precise or have the same degree of precision, including non-magnetic toolface sensors and non-gravitational inclination sensors. In any case, the toolface orientation detected via the one or more toolface sensors (e.g., sensors 245 and/or 250) may be sent via electronic signal to the controller 210 via wired or wireless transmission.

The BHA 170 may also include an MWD torque sensor 255 that is configured to detect a value or range of values for torque applied to the bit by the motor(s) of the BHA 170. The torque data detected via the MWD torque sensor 255 may be sent via electronic signal to the controller 210 via wired or wireless transmission.

The BHA 170 may also include an MWD weight-on-bit (WOB) sensor 260 that is configured to detect a value or range of values for WOB at or near the BHA 170. The WOB data detected via the MWD WOB sensor 260 may be sent via electronic signal to the controller 210 via wired or wireless transmission.

The top drive 140 may also or alternatively may include one or more sensors or detectors that provide information that may be considered by the controller 210 when it evaluates data quality. In this embodiment, the top drive 140 includes a rotary torque sensor 265 that is configured to detect a value or range of the reactive torsion of the quill 145 or drill string 155. The top drive 140 also includes a quill position sensor 270 that is configured to detect a value or range of the rotational position of the quill, such as relative to true north or another stationary reference. The rotary torque and quill position data detected via sensors 265 and 270, respectively, may be sent via electronic signal to the controller 210 via wired or wireless transmission.

The top drive 140 may also include a hook load sensor 275, a pump pressure sensor or gauge 280, a mechanical specific energy (MSE) sensor 285, and a rotary RPM sensor 290.

The hook load sensor 275 detects the load on the hook 135 as it suspends the top drive 140 and the drill string 155. The hook load detected via the hook load sensor 275 may be sent via electronic signal to the controller 210 via wired or wireless transmission.

The pump pressure sensor or gauge 280 is configured to detect the pressure of the pump providing mud or otherwise powering the BHA from the surface. The pump pressure detected by the pump sensor pressure or gauge 280 may be sent via electronic signal to the controller 210 via wired or wireless transmission.

The mechanical specific energy (MSE) sensor 285 is configured to detect the MSE representing the amount of energy required per unit volume of drilled rock. In some embodiments, the MSE is not directly sensed, but is calculated based on sensed data at the controller 210 or other controller about the apparatus 100.

The rotary RPM sensor 290 is configured to detect the rotary RPM of the drill string. This may be measured at the top drive or elsewhere, such as at surface portion of the drill string. The RPM detected by the RPM sensor 290 may be sent via electronic signal to the controller 210 via wired or wireless transmission.

In FIG. 2, the top drive 140 also includes a controller 295 and/or other means for controlling the rotational position, speed and direction of the quill 145 or other drill string component coupled to the top drive 140 (such as the quill 145 shown in FIG. 1). Depending on the embodiment, the controller 295 may be integral with or may form a part of the controller 210.

The controller 210 is configured to receive detected information (i.e., measured or calculated) from the user-interface 205, the BHA 170, and/or the top drive 140, and utilize such information to continuously, periodically, or otherwise operate to evaluate the quality of data received.

The controller 210 may be further configured to generate a control signal, such as via intelligent adaptive control, and provide the control signal to the top drive 140 to set, adjust and/or maintain drilling parameters in order to most effectively perform a drilling operation.

Moreover, as in the exemplary embodiment depicted in FIG. 2, the controller 295 of the top drive 140 may be configured to generate and transmit a signal to the controller 210. Consequently, the controller 295 of the top drive 170 may be configured to influence drilling parameters.

Figure 3:
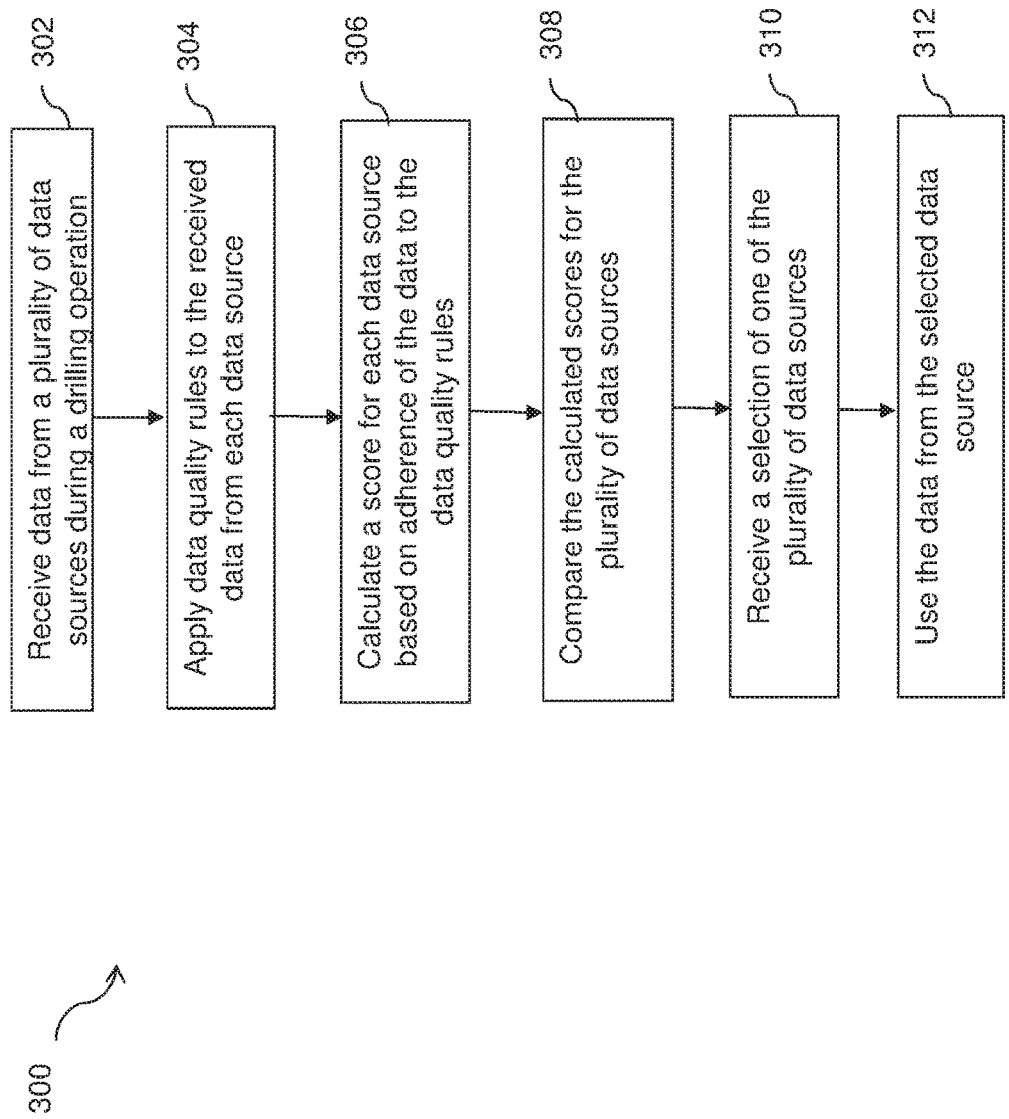
FIG. 3 is a flow chart of a method of monitoring data quality according to one or more aspects of the present disclosure.

FIG. 3 is a flow chart showing an exemplary method 300 for monitoring data quality. In various embodiments, the data quality of a single data source is monitored according to the methods described below. In some embodiments, data quality rules are applied to the data from the single data source and a quality score is calculated for the single data source. For example, depth tracking information may be obtained from a single source. Depth tracking, if not measured correctly, will impact multiple downstream applications, such as analytics and other applications that use this data to provide performance and/or safety related insights.

The method begins at step 302, where the controller 210 receives data from a plurality of data sources during a drilling operation. For example, data regarding the mud motor ΔP may be provided directly to the controller 210 by mud motor ΔP sensor 240, or from a third party that calculates the mud motor ΔP from the surface standpipe pressure just off-bottom and pressure once the bit touches bottom and starts drilling and experiencing torque. In various embodiments, the controller 210 receives the data continuously or periodically for an interval of time.

In another example, depth tracking data can be taken from two sources: (1) depth-tracking sensors and (2) a pressurized depth-tracking/ROP sensor. Depth-tracking sensors digitally count the amount of rotational movement as the drawworks drum turns when the drilling line moves up or down. Each count represents a fixed amount of distance traveled, which can be related directly to depth movement (increasing or decreasing depth). Pressurized ROP systems work on the principle of the change in hydrostatic pressure in a column of water as the height of that column is varied.

In yet another example, RPM on the bit can be measured from the top drive system and also from MWD tools. Flow out values (flow rate coming out of the annulus) can be measured using a flow paddle and a Coriolis meter. MSE values may be measured by surface systems and provided by an external system.

At step 304, the controller 210 applies data quality rules to the received data from each data source. In some embodiments, a user configures the data quality rules that are applied. For example, the data quality rules may be derived from technical thresholds of the system and/or operational thresholds of the operation being performed.

Technical thresholds include machine limits, material limits and wellbore/formation limits. Machine limits (e.g., maximum power of draw works engines) and material limits (e.g., maximum torque on drill string elements) are typically provided by the suppliers of the drilling machinery. Wellbore and formation limits may be determined by analysis of historical data from offset wells and survey data, and by active testing of the well. Such active tests are generally performed by the drilling crew on the rig.

Operational thresholds are generally derived from machine-learning algorithms. The machine-learning algorithms evaluate the acceptable boundaries or limits of the operation being run. According to certain embodiments, the system develops a knowledge base from attributes and measurements of prior and current wells, and from information regarding the subsurface of the production fields into which prior and current wells have been or are being drilled. According to this aspect of the present disclosure, the system self-organizes and validates historic, real time, and/or near real time depth or time based measurement data, including information pertaining to drilling dynamics, earth properties, drilling processes and driller reactions. This drilling knowledge base suggests solutions to problems based on feedback provided by human experts and learns from experience to provide limits or constraints on the drilling operation.

In various embodiments, the data quality rules evaluate the (1) accuracy, (2) completeness, (3) consistency, and (4) timeliness of the data. These data quality rules impact at least the validity of the data (or how well the data reflects the information is represents), and the integrity of the data (or the assurance of the accuracy and consistency of the data throughout its lifecycle). Data accuracy means the degree to which the data correctly reflects the realities of the conditions measured. In some embodiments, accuracy is measured by determining if there are any unrealistic values in a data set (e.g., data measured for a time interval). For example, is there a measurement that is outside the technical limits of the sensor? Are there any measurements that are outside of the operational limits? Are there any outlier values or null values? Data completeness refers to an indication of whether or not all the data necessary has been measured. One approach to completeness is to ensure that certain attributes always have assigned values in a data set. For example, are there any gaps in the data set? How many gaps are there for a certain time interval? Are there any measurements that are missing for a certain time period? Data consistency refers to uniformity of the data. For example, are all the values in a data set in the same units? Are the data points equally spaced and continuous? Lastly, data timeliness refers to the degree to which information is current with the environment it models. Timeliness measures how "fresh" the data is, as well as its correctness in the face of possible time-related changes, which is particularly essential in the oil and gas industry. To determine timeliness, the existence of any delay in the transmission of the data can be determined, and if so, the length of time the data is delayed can also be determined. At step 306, the controller 210 calculates a score for each data source based on adherence of the data to the data quality rules. In some embodiments, the controller 210 calculates the score in real-time. The score is indicative of the quality of the data from the data source. For example, the data source can be scored on each of the four characteristics: accuracy, completeness, consistency, and timeliness, and the four scores can be aggregated into a single score. For example, a data source could receive a score of 4 for accuracy, 5 for completeness, 7 for consistency, and 3 for timeliness, to yield an aggregated score of 19. The aggregated scores (or individual scores) can be compared to the scores for a different data source to determine which data source presents data with higher quality.

The score can be assigned using any suitable grading scale such as a numeric scale, an alphabetical scale or other scale created to rank the performance of a data source in a certain characteristic. In one embodiment, a numeric scale can be used having a range of values from 1 to 10, where 1 indicates a minimum score and 10 indicates a maximum score. Other ranges can be used, such as 1 to 5 or 1 to 100, or A to C or A to F, or a combination of a numerical and letter scale to indicate different characteristics or weighting to different characteristics (e.g., an A2 is twice the importance of a lower score D1); no limitation is implied by the ranges given in this description.

In various embodiments, the controller 210 determines or assigns a threshold score to the data source. The data source must exceed a minimum threshold score for that data source to be used in further downstream applications. For example, if the threshold score is 75, data sources having scores below 75 are excluded from further consideration. In another example, data in a range of, e.g., 10% above and/or below the threshold score, is reviewed or otherwise quality checked before being accepted, and all data having a threshold score below the lowest range are excluded from further consideration.

At step 308, the controller 210 compares the calculated scores for the plurality of data sources. In some embodiments, the calculated scores that are compared are averages of calculated scores for each data source for a predetermined period of time. For example, the calculated score for one data source may be an average of scores that are calculated over a certain time period. This calculated score is then compared to an average score of the other data sources for the same or a comparable time period. Various other embodiments include comparing the calculated score for each of the plurality of data sources against one or more of the following: (a) a calculated score for each of the other of the plurality of data sources, or an average of each such calculated score over different time periods; (b) a calculated score for the same data source over a previous time period stored in a database, or an average of each such calculated score over different time periods for the same data source; (c) a calculated score for a plurality of data sources over a previous time period stored in a database, or an average thereof; or the like. In one embodiment, the calculated score for each of the plurality of data sources may be compared one or more of the foregoing embodiments (a)-(c) for a comparable data source from an adjacent borehole.

In several embodiments, the controller 210 can display the scores for each data source. Advantageously, the controller 210 compares data quality across different data sources. In various embodiments, the comparison is presented to the user in graphical form to better visualize the quality of the measurements for a time interval. For example, the data from each data source is presented in a line graph that illustrates the data points over the time interval that the data was received, and the curves are lined up against each other such that the user can clearly see the differences in value of the data. In this way, a user can see if one data source provides significantly different values from a second data source, and if one data source supplies data that is unrealistic. In certain embodiments, the scores for each data source are presented together with the graphs. In some embodiments, the scores and/or curves are color-coded so that the user can quickly identify the data source presenting a lower quality (or higher quality). For example, scores that indicate low quality can be red in color, while scores that indicate higher quality can be green in color. In several embodiments, the curves are updated in real-time.

Figure 4:
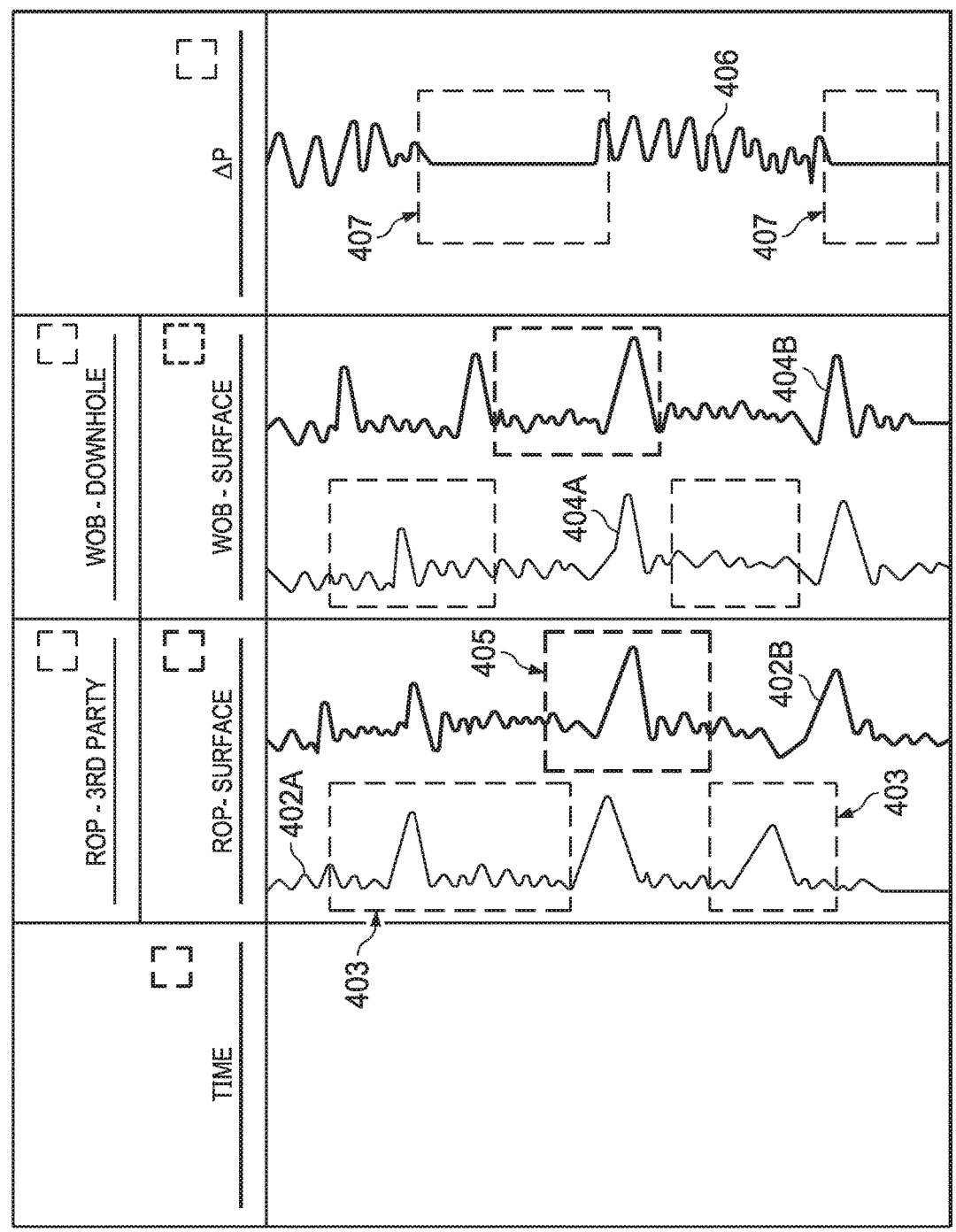
FIG. 4 is a screenshot of an exemplary graphical user interface (GUI) according to one or more aspects of the present disclosure.

FIG. 4 illustrates an exemplary screen shot 400 of a GUI. The screen shot 400 includes data for ROP from two data sources. As shown, there is a first graph 402A of ROP data from a third party and a second graph 402B of ROP data from surface measurements. The first graph 402A includes two portions 403 surrounded by a dotted rectangle, and the second graph 402B includes one portion 405 surrounded by a dotted rectangle. The portions 403 and 405 indicate where the quality of the data may have been compromised. Thus, an operator may choose to use the data in second graph 402B (or a control system may automatedly via one or more processors select such data) instead of those surrounded portions 403 in first graph 402A with potentially compromised data, and the operator (or control system) may then use the data in first graph 402A instead of the surrounded portion 405 in second graph 402B.

The screen shot 400 further includes data for WOB from two data sources. There is a first graph 404A of WOB data measured downhole and a second graph 404B of WOB data measured on the surface. The first graph 404A includes two portions surrounded by a dotted rectangle, and the second graph 404B includes one portion surrounded by a dotted rectangle. The portions indicate where in the graphs the quality of the data may be low. An operator (or control system) may therefore choose to use the data in the second graph 404B during the time periods that the quality of the data in the first graph 404A may be low, and choose to use the data in the first graph 404A during the time that the quality of the data in the second graph 404B may be low.

The screen shot 400 also includes a graph 406 of differential pressure data from a single source. The graph 406 includes two portions 407 that are surrounded by a dotted rectangle. The portions 407 surround portions that indicate that data is missing (as evidenced by a flat line). An operator (or control system) therefore understands that no data is available for those times in the portions 407.

Once the user is presented with the information regarding data quality, the user can make an informed decision on which data source to select, and accept the data from the data source with higher quality for downstream applications. At step 310, the controller 210 receives a selection of one of the plurality of data sources from, for example, the user.

At step 312, the controller 210 uses the data from the selected data source. The data from the selected data source may be used in many ways to aid in drilling operations. Examples of different ways the data may be used include, but is not limited to: identifying drilling problems and/or triggering alarms, optimizing drilling parameters, and analyzing the economics of the drilling operation. The data from the selected data can provide more accurate insights on more important or key parameters, including without limitation in this embodiment bit wear and rate of penetration.

In one aspect, the present disclosure relates to a system that includes a controller and a plurality of data sources configured to provide data to the controller. The controller is configured to receive data from a plurality of data sources during a drilling operation; apply data quality rules to the received data; calculate a score for each data source of the plurality of data sources based on adherence of the received data for that data source to the data quality rules; compare the calculated scores for the plurality of data sources to determine which calculated scores meet or exceed a threshold score; receive a selection of one of the plurality of data sources having a calculated score that meets or exceeds the threshold score; and use the data from the selected data source.

In a second aspect, the present disclosure relates to a method of monitoring data quality. The method includes receiving data from a plurality of data sources during a drilling operation; receiving, from a user, data quality rules; applying the data quality rules to the received data; calculating a score for each data source in real-time based on adherence of the received data to the data quality rules; comparing the calculated scores for the plurality of data sources to determine which data source has a higher data quality; providing the calculated scores and a visual comparison of the received data for the plurality of data sources; receiving, from the user, a selection of one of the plurality of data sources; and using the data from the selected data source.

In a third aspect, the present disclosure relates to a non-transitory machine-readable medium having stored thereon machine-readable instructions executable to cause a machine to perform operations. The operations include receiving data for a parameter from a plurality of data sources during a drilling operation, wherein the plurality of data sources comprises a plurality of sensors; applying data quality rules to the received data for the parameter; calculating a score for each data source based on adherence of the received data to the data quality rules; displaying the calculated scores and the received data for each data source in graphic form; receiving a selection of one of the plurality of data sources; and using the data from the selected data source.

Thus, various systems, apparatuses, methods, etc. have been described herein. Although embodiments have been described with reference to specific example embodiments, it will be evident that various modifications and changes may be made to these embodiments without departing from the broader spirit and scope of the system, apparatus, method, and any other embodiments described and/or claimed herein. Further, elements of different embodiments in the present disclosure may be combined in various different manners to disclose additional embodiments still within the scope of the present embodiments. Additionally, the specification and drawings are to be regarded in an illustrative rather than a restrictive sense.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A system, comprising:
   a plurality of data sources configured to collect data during a drilling operation, the plurality of data sources including a first data source and a second data source being different than the first data source; and
   a controller configured to:
      receive data for a drilling parameter during a time period from the plurality of data sources during the drilling operation;
      apply data quality rules to the received data for the drilling parameter;
      calculate a score for each data source of the plurality of data sources based on adherence of the received data for that data source to the data quality rules;
      compare each of the calculated scores for the plurality of data sources to a threshold score to determine which calculated scores meet or exceed the threshold score;
      visually present a comparison of the received data in graphic form, wherein the graphic form comprises a curve fitted to the received data from each data source of the plurality of data sources, wherein visually presenting the comparison further comprises visually comparing curves for the plurality of data sources side by side for the time period to provide a visual comparison to a user;
      receive a selection of one of the plurality of data sources having a calculated score that meets or exceeds the threshold score; and
      use the data from the selected data source.

2. The system of claim 1, wherein the plurality of data sources comprises a plurality of sensors in communication with the controller.

3. The system of claim 1, wherein the controller is further configured to receive the data quality rules from a user.

4. The system of claim 1, wherein the data quality rules are derived from at least one of: technical thresholds of the system or operational thresholds of the drilling operation.

5. The system of claim 4, wherein the operational thresholds are based on limits determined from machine-learning algorithms.

6. The system of claim 1, wherein the graphic form is color-coded to indicate a data source having a higher or lower quality relative to one or more of the other data sources.

7. The system of claim 1, wherein using the data from the selected data source comprises at least one of identifying a drilling problem, optimizing a drilling parameter, and analyzing economics of the drilling operation.

8. A method of monitoring data quality, which comprises receiving data from a plurality of data sources during a drilling operation;
   receiving, from a user, data quality rules;
   applying the data quality rules to the received data;
   calculating a score for each data source in real-time based on adherence of the received data to the data quality rules;
   comparing each of the calculated scores for the plurality of data sources to the other calculated scores for the plurality of data sources to determine which data source has a higher data quality;
   providing the calculated scores and a visual comparison of the received data for the plurality of data sources, the visual comparison comprising a comparison of a first data source for a drilling parameter during a time period and a second data source different from the first data source for the drilling parameter during the time period;
   receiving, from the user, a selection of one of the plurality of data sources; and
   using the data from the selected data source.

9. The method of claim 8, wherein the data quality rules are derived from at least one of: technical thresholds of a drilling system or operational thresholds of the drilling operation.

10. The method of claim 8, wherein the visual comparison comprises a curve fitted to the received data from each data source.

11. The method of claim 10, wherein curves for the plurality of data sources are compared side by side.

12. The method of claim 10, wherein the curves for each data source are color-coded to indicate a data source having a higher or lower quality relative to one or more of the other data sources.

13. A non-transitory machine-readable medium having stored thereon machine-readable instructions executable to cause a machine to perform operations that, when executed, comprise:
   receiving data for a parameter from a plurality of data sources during a drilling operation, wherein the plurality of data sources comprises a first sensor and a second sensor having different sensor types;
applying data quality rules to the received data for the parameter;
calculating a score for each data source based on adherence of the received data to the data quality rules;
displaying the calculated scores and the received data for each data source in graphic form, wherein the graphic form comprises a curve fitted to the received data from each data source, and curves for the plurality of data sources are compared side by side;
receiving a selection of one of the plurality of data sources; and
using the data from the selected data source.

14. The non-transitory machine-readable medium of claim 13, wherein the data quality rules are derived from at least one of: technical thresholds of a drilling system or operational thresholds of the drilling operation.

15. The non-transitory machine-readable medium of claim 13, wherein the curves or calculated scores for each data source are color-coded to indicate a data source having a higher or lower quality relative to one or more of the other data sources.

16. The non-transitory machine-readable medium of claim 13, wherein using the data from the selected data source comprises at least one of identifying a drilling problem, optimizing a drilling parameter, and analyzing economics of the drilling operation.

17. The method of claim 8, wherein the step of applying the data quality rules to the received data includes evaluating the data based on at least one of accuracy, completeness, consistency, and timeliness of the data.

18. The method of claim 8, wherein the visual comparison comprises an indicator indicating where the quality of the first and second data sources is low during the time period.

19. The method of claim 8, wherein the visual comparison comprises an indicator indicating where data is missing in the first and second data sources during the time period.

20. The method of claim 8, wherein the first data source is a rate of penetration (ROP) measurement from an instrumentation system, wherein the second data source is a ROP measurement from a third party calculation.

\* \* \* \* \*